United States Patent [19]
Eastcott et al.

[11] 3,719,099
[45] March 6, 1973

[54] DRIVE WHEEL FOR FRICTION MINE HOIST

[75] Inventors: Peter de Hertel Eastcott; James Ernest Welch, both of Peterborough, Ontario, Canada

[73] Assignee: Canadian General Electric Company Limited, Toronto, Ontario, Canada

[22] Filed: Jan. 29, 1971

[21] Appl. No.: 110,989

[52] U.S. Cl. ..................74/230.3, 254/190
[51] Int. Cl. .............................F16h 55/40
[58] Field of Search ..254/150, 190; 74/230.3, 230.4; 188/72.5

[56] References Cited

UNITED STATES PATENTS

| | | | |
|---|---|---|---|
| 478,292 | 7/1892 | Simcox | 74/230.3 |
| 1,656,935 | 1/1928 | Bahan | 74/230.4 |
| 2,218,817 | 10/1940 | Frost | 74/230.3 |
| 3,279,762 | 10/1966 | Bruns | 254/190 |
| 3,318,165 | 5/1967 | McAleer et al. | 74/230.4 |
| 3,396,824 | 8/1968 | Meier | 188/72.5 |

FOREIGN PATENTS OR APPLICATIONS

| | | | |
|---|---|---|---|
| 1,032,095 | 6/1953 | France | 74/230.4 |

Primary Examiner—Harvey C. Hornsby
Assistant Examiner—Merle F. Maffei
Attorney—Raymond A. Eckersley, Frank L. Neuhauser, Oscar B. Waddell and Joseph B. Forman

[57] ABSTRACT

A drive wheel for a friction mine hoist. The wheel has a shaft adapted for rotation in bearing on a horizontal axis, a hub on the shaft coaxial with respect thereto, a flat ring secured to the periphery of the hub concentric with the hub with its flat faces at right angles to the axis of rotation, a cylindrical rim encircling the ring coaxial with the axis of rotation, an annular flange on each end of the rim having an inner portion projecting radially inward in spaced relation to the hub and shaft, a plurality of flat ribs located in angularly spaced relation between the hub, ring, rim and flanges with their flat sides directed radially and axially, and tread retaining structure on the periphery of the rim. The ring, rim, flanges and spokes are rigid members welded together and the welded structure is secured to the hub in a way which results in a very stiff wheel structure.

1 Claim, 4 Drawing Figures

3,719,099

INVENTORS
PETER DEH. EASTCOTT
JAMES E. WELCH
BY

Patent Agent

DRIVE WHEEL FOR FRICTION MINE HOIST

This invention relates to the structure of the wheel for driving the ropes which support the conveyances in a friction mine hoist.

A friction or Koeppe mine hoist is essentially a large wheel or drum from which hangs a number of steel ropes that support the conveyances. The wheel is fixed to a horizontal shaft which is driven by an electric motor for rotation in two bearings, one at each side of the wheel. A friction tread on the periphery of the wheel causes the ropes to follow rotation of the wheel and in so doing raise or lower the conveyances according to the direction of rotation.

As is well known, the wheel and its supporting structure are subjected to extremely severe operating conditions in that they carry the full weight of the ropes, the conveyances and the load being hoisted while this weight is accelerated or decelerated. As a result the cyclic stresses induced in the wheel are high and change magnitude and direction very rapidly. A stress reversal takes place every revolution. In welded wheel structures, as many are today, it is very difficult to design and make welds that will stand up to these stresses. Structures of known art tend not to be stiff enough to resist flexing to the extent necessary to prevent cracks from developing in the welds subjected to the higher cyclic stresses. Welds located where they can be seen may be inspected periodically during manufacture and rewelded if cracked. If the structure is stress relieved, rewelding should be done first. Periodic inspection is, of course, a necessity in the operation of a hoist, but if it becomes more frequent than called for by the mine regulations, it can be a burden on the operation of the mine. No one likes to rework welds because it is costly, time consuming, and may impair the strength of the wheel, unless its welds are stress relieved. Moreover, a wheel may have welds that are difficult, if not impossible to inspect, in which case the strength of the wheel may be placed in doubt.

Therefore, the object of this invention is to provide a drive wheel for a friction mine hoist, a wheel of welded construction which is very stiff and in which all the welds are readily accessible for inspection, both during and after manufacture.

According to the invention a drive wheel for a friction mine hoist has a shaft adapted for rotation in bearings on a horizontal axis, a hub on the shaft coaxial with respect thereto, a flat ring or washer-like disc secured to the periphery of the hub concentric with the hub with its flat faces at right angles to the axis of rotation, a cylindrical rim encircling the ring coaxial with the axis of rotation, an annular flange on each end of the rim having an inner portion projecting radially inward in spaced relation to the hub and shaft, a plurality of flat ribs located in angularly spaced relation between the hub, ring, rim and flanges with their flat sides directed radially and axially, and tread retaining structure on the periphery of the rim. The ring, rim, flanges and ribs are rigid members welded together and the welded structure is secured to the hub in a way which results in a very stiff wheel structure.

Two embodiments of the invention will now be described with reference to the accompanying drawings, in which.

Figure 1:
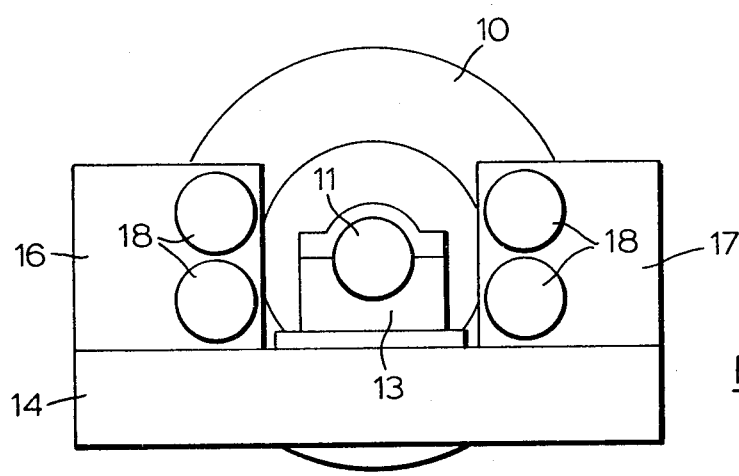
FIGS. 1 and 2 are profile and plan views respectively of a drive wheel and its supporting structure.
Figure 2:
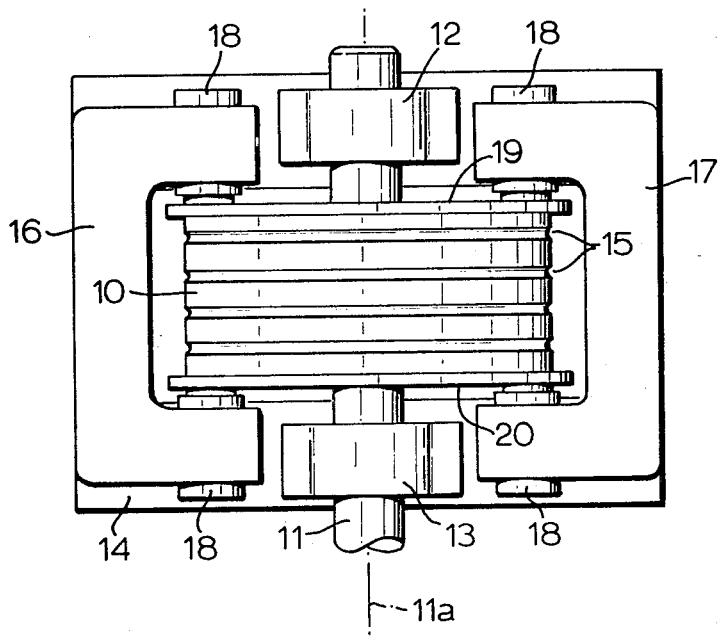

Referring now to FIGS. 1 and 2 there is shown a drive wheel 10 having a shaft 11 supported in bearings 12 and 13 for rotation on a horizontal axis 11a. The bearings are located close to the wheel, one on either side thereof, and are supported on a base 14 which in turn is supported on a suitable foundation. An electric motor mechanically coupled to the shaft at the end thereof shown broken may be used to drive the wheel so that the steel ropes running in grooves 15 of the friction tread on the periphery of the wheel raise or lower the conveyances in the mine shaft as the wheel turns. The two heavy C-shaped frames 16 and 17 axially spanning the wheel at diametrically opposite locations and resting on base 14 supported eight brake actuators 18. When energized for braking the wheel, these actuators apply balanced braking forces to braking surfaces 19 and 20 on the opposite ends of the wheel.

The construction of a preferred embodiment of the wheel will now be described with reference to FIG. 3. The wheel is a welded structure consisting of a solid cylindrical hub 21, a flat ring or washer-like disc 22, a cylindrical rim 23, a pair of annular flanges 24 and 25, a plurality of ribs 26 and 27, four pairs of tread retaining flanges 28 and 29, and a plurality of reinforcing blocks 30. Ring 22 encircles the hub midway of its length with its flat sides at right angles to the axis of rotation 11a of the hub, and rim 23 encircles the ring coaxial with the axis of rotation. Annular flanges 24 and 25 abut the ends of the rim with their centers on the axis of rotation, and each one has a substantial portion projecting radially inward from the rim toward the hub, leaving a relatively large annular opening between the flange and the hub, and a lesser portion projecting radially outward from the rim. The outer surfaces 19 and 20 of these flanges may be used as braking surfaces. Ribs 26 and 27 are equally spaced radially around the hub, extending therefrom to the ring, rim and flanges with their flat sides directed axially.

Ring 22, flanges 24 and 25 and ribs 26 and 27 are flat, rigid members cut from a thick plate stock that can be welded, e.g., low carbon alloy steel plate. Rim 23 is shaped from a like material. Ring 22 is welded to rim 23 on both sides at 31 and 32; rim 23 is welded to flanges 24 and 25 at 33 to 36; and each one of the ribs 26 and 27 is welded on both sides at its junctures with the ring, rim and flanges. The welded structure may now be machined to an interference fit around a hub which has also been machined to receive the structure. The ring and ribs are then welded on both sides at all their junctures with the hub as indicated at 37, 38 and 39. Preferably, all the welds are continuous arc welds. They are readily made because the inner edges of flanges 24 and 25 are spaced far enough from the hub and ribs, and the ribs far enough apart that a welder can easily get inside the wheel compartments and made the welds; there are no blind or inaccessible areas that cannot be easily welded. Preferably, the hub is forged from a high strength low carbon alloy steel. Tread retaining rings 28 and 29 are cut from plate and welded to the periphery of ring 23, after which blocks 30 are inserted at spaced intervals between the pairs of retaining rings and welded to the rings and rim. The tread receiving grooves defined by the pairs of rings 28, 29 may now be machined to the shape shown in FIG. 3. During the set-up for this machining operation, the outer faces of flanges 24 and 25 are machined smooth at 19 and 20 respectively and normal to the axis of rotation, and the hub bored coaxial therewith to the size necessary for an interference fit on shaft 11.

Figure 4:
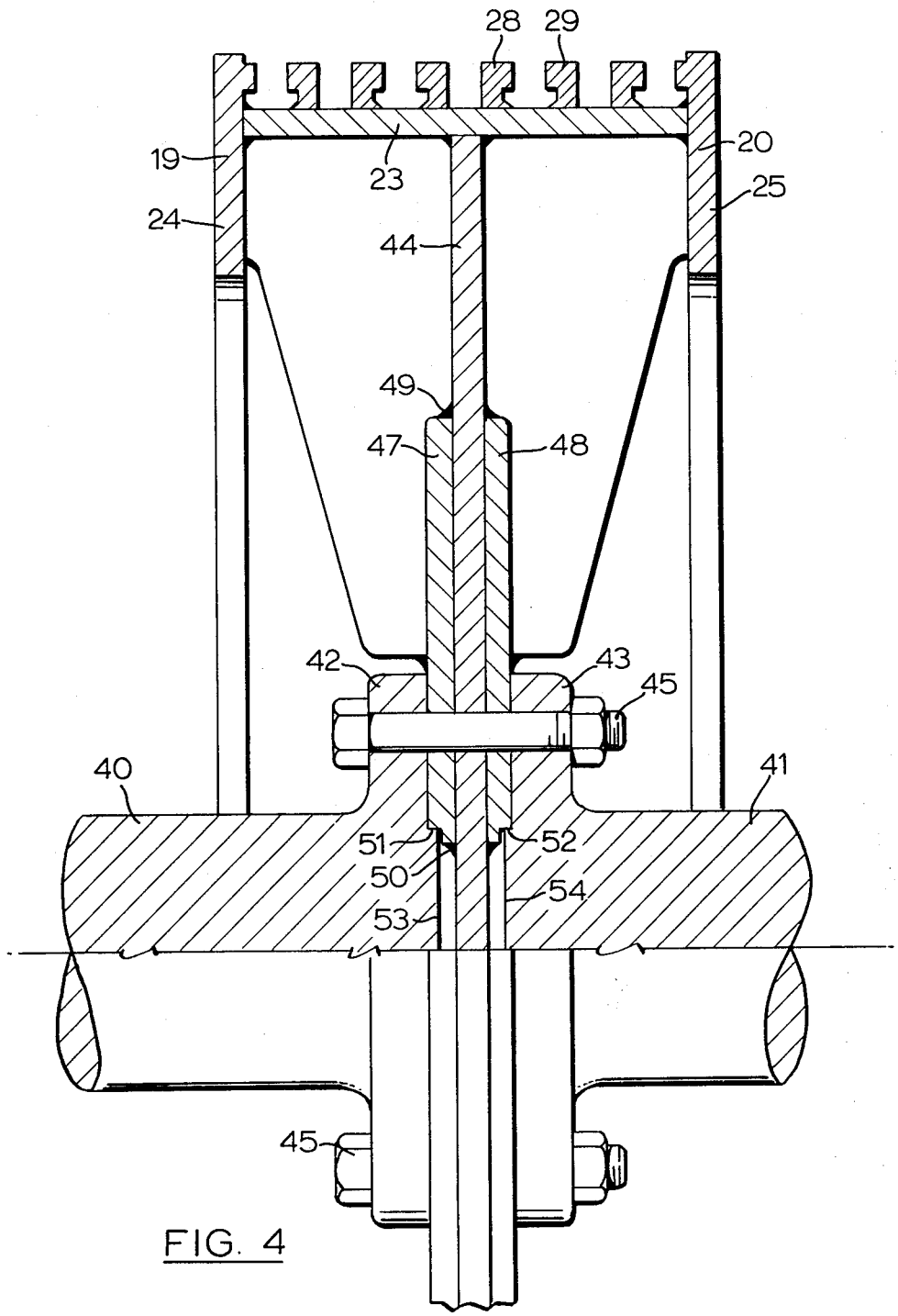
FIG. 4 is a view in section of another wheel structure.

FIG. 4 illustrates essentially the same welded wheel structure but a different hub and attachment means. In this figure the shaft and hub consist of two stubs 40 and 41 forged from high strength alloy steel and machined to the shape shown. The two stubs have flanged ends 42 and 43 between which the disc 44 of the welded structure is clamped by means of a plurality of bolts 45 passing through aligned holes in the flanges and ring and secured by nuts threaded onto the bolts. The welded structure and the two stubs are coaxial. Disc 44 is a solid, flat, circular member reinforced with concentric annular sideplates 47 and 48 welded to the disc along their inner and outer circular edges as indicated at 49 and 50. The apertures of plates 47 and 48 have annular rabbets 51 and 52 machined to received spigots 53 and 54 on the flanged ends of the stubs. The spigots fit tightly into the rabbets so that radial loads on the wheel are transferred to the stubs without first going through the bolts, leaving the bolts as tension members only for holding the components together. In actual designs, the aggregate bolt tensions are sufficient to transmit all radial and torque loads between the shaft flanges and center disc assembly by friction alone.

Figure 3:
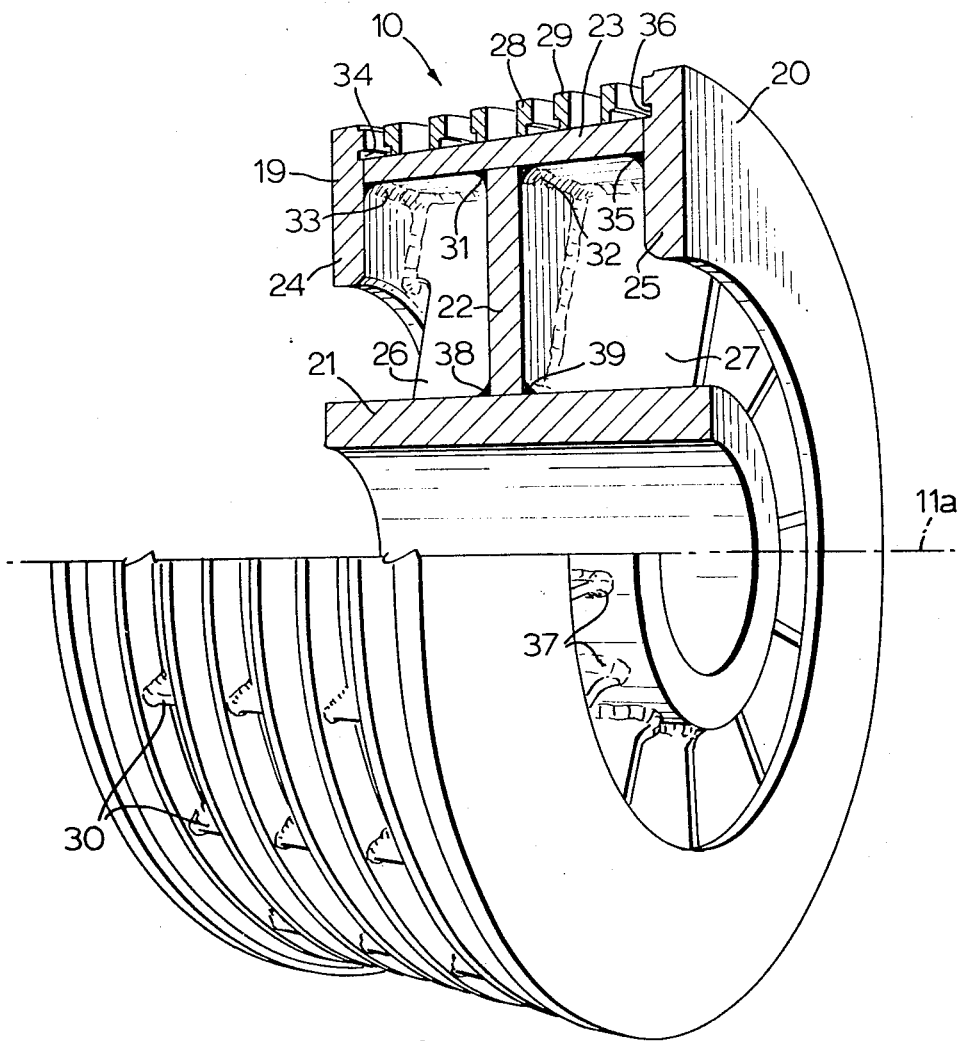
FIG. 3 is a perspective view of the wheel in quarter section.

In the FIG. 4 construction, the disc, rim, flanges and ribs are welded together into a stiff unit as in FIG. 3, but the welded structure is not welded to the hub. Instead, the hub and shaft are combined as two stub shafts which support the welded structure by means of the rabbets, spigots and bolts. This also provides a very strong and rigid wheel structure. In both wheel constructions all of the welds are readily accessible for inspection through the large openings left between the hub and flanges 24 and 25.

In addition to providing a very stiff wheel in which the welds are accessible, the invention leads to a wheel structure offering a number of other advantages. Firstly, placing the braking surfaces on the ends of the wheel produces a wheel and brake assembly that is very small and compact. This reduces the space required in the wheel house. Secondly, braking surfaces on the ends of the wheel are easily kept clean because the outer flange portions act as slingers for water and muck thrown off the wheel from rotation, keeping these materials away from the braking surfaces. Thirdly, a wheel of this type can be readily adapted to serve as a magazine for the rope when roping the moist. This is accomplished by having a substantial portion of flanges 24 and 25 extend outwardly beyond rim 23, and attaching a temporary wrapper around the periphery of the wheel over the treads.

What I claim as new and desire to secure by Letters Patent of the United States is:

1. A drive wheel assembly for a friction mine hoist having a shaft for rotation in bearings on a horizontal axis and a wheel structure made from rigid structural components welded together, said wheel structure comprising a circular, tubular hub secured to said shaft coaxial with respect thereto; a flat ring encircling said hub midway of its axial length, normal with respect to said axis and having the inner edge of the ring abutting the hub; a circular, tubular rim encircling said ring midway of the axial length of the rim, coaxial with respect to said hub and having the outer edge of the ring abutting the rim; a flat annular member disposed coaxially and normal to said axis with one flat face abutting one end of said rim, with a minor portion projecting radially outward from the rim and a major portion projecting radially inward from the rim so as to define an annular opening between the hub and the member; a like member abutting the other end of said rim in the same relation to the rim as said member; a plurality of flat ribs located on both sides of said ring in angularly spaced relation between said hub, ring, rim and members with their flat sides directed radially and axially and with their respective edges abutting the hub, ring, rim and members; welds along all said abutting surfaces for securing said hub, ring, rim, members and ribs together in a very stiff wheel structure; a braking surface normal to said axis on the other flat face of each one of said members; and a plurality of annular tread retaining members welded to the peripheral surface of said rim for supporting a plurality of axially spaced rope treads.

* * * * *